(12) United States Patent
Ricketts et al.

(10) Patent No.: US 7,572,180 B2
(45) Date of Patent: Aug. 11, 2009

(54) DISTRIBUTION LEVELING FOR AN AGRICULTURAL COMBINE

(75) Inventors: Jonathan E. Ricketts, Ephrata, PA (US); Bradley J. Wagner, Wrightsville, PA (US); Todd Cannegieter, Leola, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/069,871

(22) Filed: Feb. 12, 2008

(65) Prior Publication Data

US 2008/0194306 A1   Aug. 14, 2008

Related U.S. Application Data

(60) Provisional application No. 60/901,228, filed on Feb. 13, 2007.

(51) Int. Cl.
  *A01F 12/32* (2006.01)
  *B07B 1/00* (2006.01)
(52) U.S. Cl. .................................................. 460/101
(58) Field of Classification Search ................ 460/101, 460/9, 92; 73/587, 597; 56/10.1, 10.2 R; 209/416, 233
  See application file for complete search history.

(56) References Cited

U.S. PATENT DOCUMENTS

| | | | |
|---|---|---|---|
| 296,922 A | | 4/1884 | Campbell |
| 2,500,448 A | * | 3/1950 | Bozarth ...................... 209/416 |
| 2,893,558 A | | 7/1959 | Zollinger .................... 209/254 |
| 3,186,548 A | | 6/1965 | Stroburg et al. ............. 209/416 |
| 4,344,443 A | * | 8/1982 | De Busscher et al. ......... 460/97 |
| 4,535,788 A | * | 8/1985 | Rowland-Hill et al. ......... 460/9 |
| 4,548,214 A | * | 10/1985 | Sheehan et al. ................ 460/9 |
| 4,557,276 A | | 12/1985 | Hyman et al. ........... 130/27 AE |
| 4,736,753 A | | 4/1988 | Glaubitz et al. ......... 130/27 AE |
| 4,875,889 A | | 10/1989 | Hagerer et al. ................ 460/1 |
| 4,897,071 A | * | 1/1990 | Desnijder et al. ............. 460/10 |
| 5,205,786 A | | 4/1993 | Murphy ........................ 360/9 |
| 5,338,257 A | | 8/1994 | Underwood ................... 460/8 |
| 5,795,223 A | | 8/1998 | Spiesberger et al. ........ 460/102 |

(Continued)

FOREIGN PATENT DOCUMENTS

EP   0212183   3/1987

(Continued)

*Primary Examiner*—Árpád Fábián-Kovács
(74) *Attorney, Agent, or Firm*—Michael G. Harms; John Williams Stader; Patrick M. Sheldrake

(57) ABSTRACT

A method and system for controlling distribution of crop material to a cleaning sieve of an agricultural combine, for reducing grain loss, including while the combine is tilted sidewardly relative to horizontal, involving controlling the angular orientation of a distributor disposed between a threshing system of the combine and the sieve, for distributing a mat of the crop material onto the sieve evenly across an extent thereof. The angular orientation of the distributor can be set in advance of tilting of the combine, to adjust for a variety of conditions, including uneven outputting of the crop material from the threshing system, and the set orientation can be automatically maintained or actively adjusted to control a desired operating parameter such as grain loss, even as the combine is variously tilted and the angular orientation of the sieve relative to the combine is independently adjusted to maintain the sieve horizontal.

5 Claims, 9 Drawing Sheets

U.S. PATENT DOCUMENTS

| | | | |
|---|---|---|---|
| 6,579,172 B2 | 6/2003 | Lauer | 460/101 |
| 6,672,957 B2 * | 1/2004 | Voss et al. | 460/101 |
| 6,843,719 B1 * | 1/2005 | Sacquitne | 460/101 |
| 2002/0128054 A1 * | 9/2002 | Lauer | 460/101 |
| 2006/0155449 A1 * | 7/2006 | Dammann | 701/50 |
| 2006/0229119 A1 * | 10/2006 | Wamhof et al. | 460/101 |

FOREIGN PATENT DOCUMENTS

EP 0459109 12/1991

* cited by examiner

DISTRIBUTION LEVELING FOR AN AGRICULTURAL COMBINE

This application claims the benefit of U.S. Provisional Application No. 60/901,228, filed Feb. 13, 2007.

TECHNICAL FIELD

This invention relates generally to distribution leveling for a combine, and more particularly, to a system and method for leveling or evening the distribution of threshed crops being delivered from the threshing system to the cleaning system of a combine, including when the receiving component of the cleaning system is tilted to accommodate uneven terrain, such as when the combine is traveling along a hillside.

BACKGROUND ART

U.S. Provisional Application No. 60/901,228, filed Feb. 13, 2007, is incorporated herein by reference in its entirety.

Combines are used all over the world to harvest a good many different crops. A typical combine configuration utilizes a separation or threshing system including one or more rotors partially or fully surrounded by a perforated concave, wherein threshed crop material will fall through the perforations of the concave enroute to a cleaning system operable for separating grain of the threshed crop material from material other than grain (MOG). Often, the region of discharge of this threshed crop material from the separating system is not directly or completely above the cleaning system, and a pan or pans, conveyors, or the like are used for conveying and directing the crop material to the cleaning system. It has been observed that not all types of crops will separate in the same manner, and/or exit the threshing system evenly, and, as a result, the cleaning system may be loaded unevenly, even if an intermediate pan or conveyor system is used between the threshing and cleaning systems. For instance, when viewing a separating system from the front or rear, the threshed crop material may be observed to exit the threshing system more heavily on one side or the other. In other instances, the crop material may exit more or less evenly. This characteristic can also vary for an individual crop, and within a field and during a single crop harvesting session, for a variety of reasons, such as, but not limited to, variances in crop population, yield, moisture content and maturity level. A significant problem that can result from uneven distribution of crop material to the cleaning system is increased grain loss resulting from overloading of regions of the cleaning system sieve or sieves.

A variety of devices and systems have long been used for addressing uneven loading problems, but primarily in the context of those arising from operation of a combine on a side slope. Reference in this regard, Hyman et al., U.S. Pat. No. 4,557,276, issued Dec. 10, 1985 to Sperry Corp. which discloses a four-way leveling mechanism for a combine cleaning apparatus. Reference also in this regard with respect to a grain pan disposed between the threshing system and the cleaning system, Hagerer et al., U.S. Pat. No. 4,875,889, issued Oct. 24, 1989 to Deere & Co. which discloses use of adjustable vanes for compensating for uneven material distribution over a grain pan for delivery of threshed crop material to a cleaning system; and Grobler European Patent No. EP0212183 B1 published Mar. 4, 1987, which discloses a combine harvester including a preparation floor intermediate the threshing system and an upper screen of a cleaning system, wherein the preparation floor and screen are independently pivotable laterally.

An observed shortcoming of the apparatus of U.S. Pat. Nos. 4,557,276 and 4,875,889, is that when used alone, such that system is leveled relative to a side slope on which the combine is located, crop material distribution on one or more regions of the sieve may still be concentrated or heavier, as a function of the crop material flow from the threshing system, and significant grain loss can still occur. The independently tiltable, two section preparation floor of European Patent No. EP0212183 B1, because of the split between the two sections, may not allow adequate distribution of crop material over the entire width thereof, particularly if crop deposition thereon from the threshing system is significantly greater on one of the sections, and if the preparation floor is used for adjusting only for a side hill condition, it may not remedy heavier crop material deposition on one side thereof at all.

In light of the capabilities and limitations of the apparatus discussed above for distributing crop material delivery to a cleaning system of a combine, what is sought is a system and method which allows optimizing this capability for accommodating both uneven threshing system output, and uneven terrain, particularly side slope conditions.

SUMMARY OF THE INVENTION

What is disclosed is a system and method for distributing crop material to a cleaning system of a combine, which allows optimizing the capability for accommodating both uneven threshing system output, and uneven terrain, particularly side slope conditions.

According to a preferred aspect of the invention, the method and system is operable for controlling distribution of crop material to a cleaning sieve of the cleaning system, for reducing grain loss, including while the combine is tilted sidewardly relative to horizontal. The angular orientation of the sieve can also be controlled to compensate for the tilt as a separate function under control of a separate leveling system, or under control of the system of the invention. The system of the invention functions by controlling the angular orientation of a distributor disposed between the threshing system and the sieve, for distributing the crop material onto the sieve evenly across an extent thereof. The angular orientation of the distributor can be set in advance of tilting of the combine, to adjust for a variety of conditions, including uneven outputting of the crop material from the threshing system, and the set orientation can be automatically maintained as the combine is variously tilted, and the cleaning system sieve is leveled if a leveling system is present, or is tilted with the combine.

According to another preferred aspect of the invention, the angular orientation of the distributor is controlled by a control system, which can be, but is not limited to, a suitable programmable controller currently used for controlling combine operations. The system can also include an input device to enable an operator to input positional commands for the distributor, to enable the operator to determine and set the distributor angular position. Here, it should be understood that a threshing system will often discharge crop material at higher rates, or heavier, from some regions thereof compared to others. This can occur for a variety of reasons, such as, but not limited to, crop type, population, and moisture content, and can vary at least somewhat over the course of a harvesting episode. This can also occur, at least in part, as a result of combine settings, such as, but not limited to, a speed of operation of a rotor of the threshing system, and a gap between a rotor and concave of the threshing system.

According to another preferred aspect of the invention, the distributor setting can be a function of an indicator of performance, such as that of the cleaning system, which can include, but is not limited to, grain loss, and which can be determined and monitored on an ongoing basis, in real-time, or near real-time, using monitors or sensors, such as, but not limited to, conventional, commercially available grain loss sensors. Grain loss sensors are typically located adjacent an edge of the cleaning sieve past which elements of material other than grain are propelled for removal from the cleaning system. Generally, in operation, grain in the crop material will fall through the sieve, while a flow of air directed upwardly through the sieve and toward the edge operates in cooperation with vibration of the sieve, for urging the lighter elements of the crop material other than grain (MOG) toward and over or past the edge. Some grain will typically be mixed with the MOG, so as to be lost. As discussed above, it has been found that the amount of grain mixed with the MOG can vary as a function of crop material distribution over the surface of the sieve, which, in turn, can be a function of factors including, but not limited to, the evenness of the delivery of a mat of the crop material onto the sieve (which can be a function of factors discussed above, e.g., crop type, population, and moisture content, and threshing system settings, e.g., rotor speed and concave gap), and the angular orientation of the sieve, such as a tilting thereof resulting from operation of the combine on a hillside.

Grain loss sensors are operable in the conventional, well-known manner, for instance, by sensing electrical capacitance change, for measuring or quantifying the amount of grain loss past the edge of the cleaning sieve, and can be disposed, for instance, adjacent opposite ends of the edge of the sieve, and at one or more intermediate locations therealong, for determining grain losses at those locations, which information can be used for determining a distribution of grain losses across the edge or extent of the sieve. Grain loss sensors can be used alone, or with one or more other sensors, for instance, a load sensor, mass sensor, optical sensor, or the like, for determining crop material distribution on or to the cleaning sieve, and/or on or a crop material distributor disposed intermediate the threshing and cleaning systems, such as, a grain pan, sieve, preparation floor, or the like.

According to still another preferred aspect of the invention, the control system can control the angular orientation of the distributor for distributing crop material to the cleaning sieve in a desired or required manner for minimizing grain loss, during sideward tilting of the combine, and while the cleaning sieve is controlled at different angular orientations for accommodating the tilt, and/or for further distributing the crop material thereover.

DETAILED DESCRIPTION OF THE INVENTION

Figure 1:
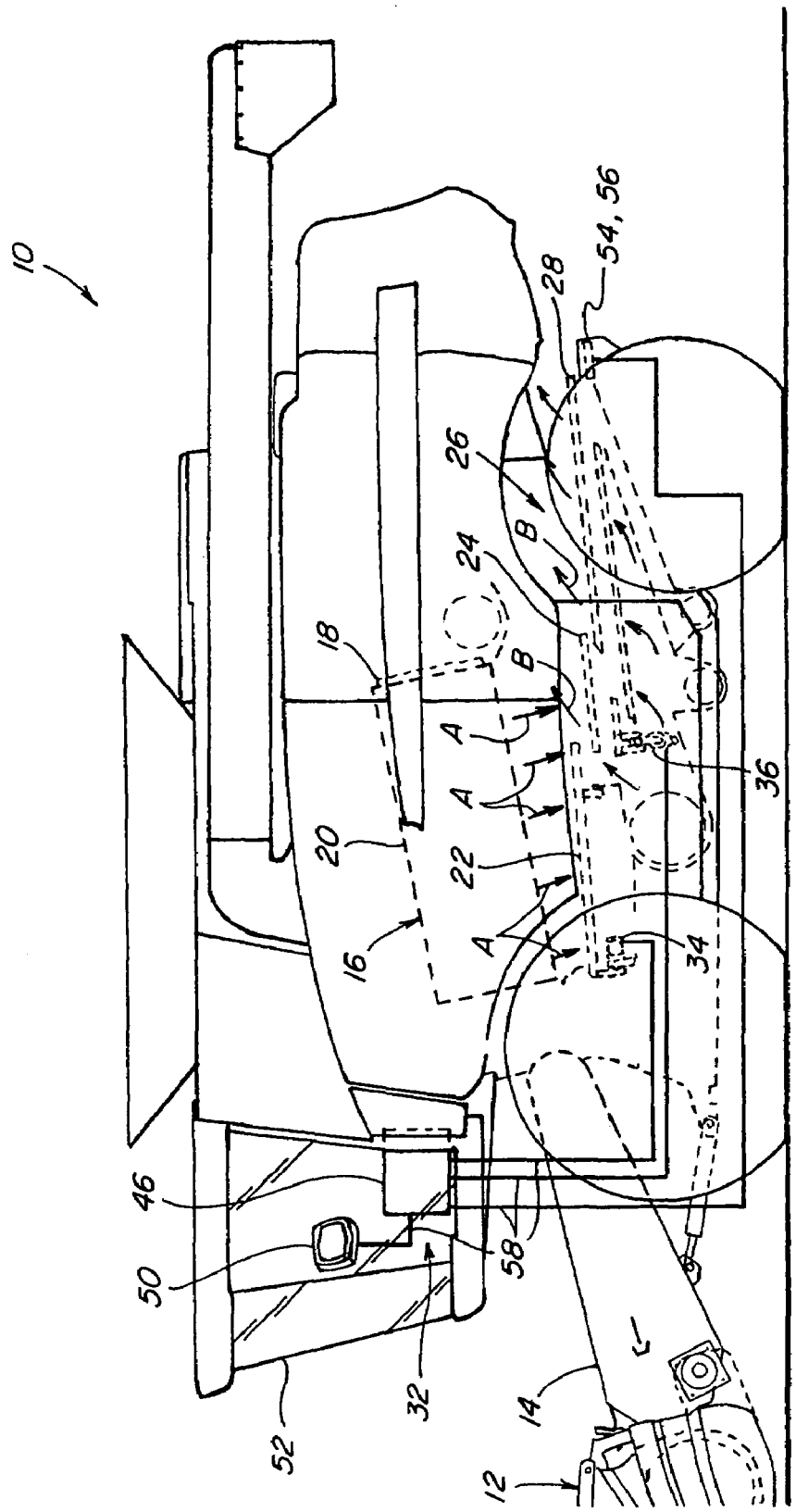
FIG. 1 is a side view of an agricultural combine, including a system for distributing crop material to a cleaning system of the combine, according to the present invention.

Referring now to the drawings, wherein preferred embodiments of the present invention are shown, in FIG. 1, a typical self-propelled agricultural combine 10 is shown, including a header 12 mounted on a front end thereof, and operable for severing crops from a field during forward motion of combine 10. Combine 10 includes a feeder 14 operable for conveying the cut crops to a rotary threshing system 16 within combine 10. Threshing system 16 generally includes one or more rotors 18 rotatable within a corresponding number of perforated concaves 20, for threshing and separating smaller elements of crop material including grain from larger elements such as stalks, leaves and the like. Flows of the smaller elements of the crop material are discharged through the perforations of concave 20, as denoted generally by arrows A. Generally, the flows of crop material denoted by arrows A will be uneven, so as to be more concentrated or heavier in some regions, and lighter in other regions, which unevenness will be the result of one or more of a variety of factors, as discussed above.

The flows of crop material, denoted by arrows A, will fall mostly onto a crop material distributor 22 disposed beneath threshing system 16, which distributor 22 can comprise a conventionally constructed grain pan operable for conveying crop material rearwardly thereover to a rear edge thereof, over which the crop material will be propelled so as to fall as a mat onto an upper cleaning sieve 24 of a cleaning system 26 of combine 10. Alternatively, distributor 22 can comprise a sieve. As the crop material mat drops onto upper cleaning sieve 24, that sieve will be vibrated while a flow of air is directed upwardly and rearwardly therethrough, as denoted by arrows B, such that larger, lighter elements of the crop material other than grain will be directed over or past a rear edge 28 of sieve 24, for disposal, in the well-known manner. Smaller, heavier elements of the crop material, including grain, will be allowed to pass downwardly through sieve 24 to a lower sieve 30, for further cleaning, again, in the well known manner.

Figure 2:
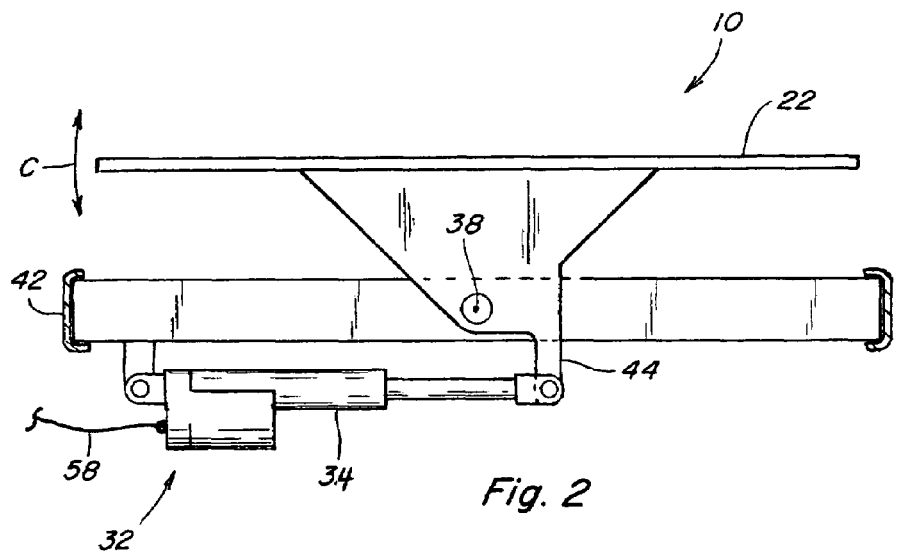
FIG. 2 is an enlarged fragmentary end view of a representative crop material distributor or cleaning sieve of the combine of FIG. 1, showing an actuator in combination therewith and controllably operable for positioning the distributor or sieve in a selected angular orientation within a range of angular orientations.
Figure 3:
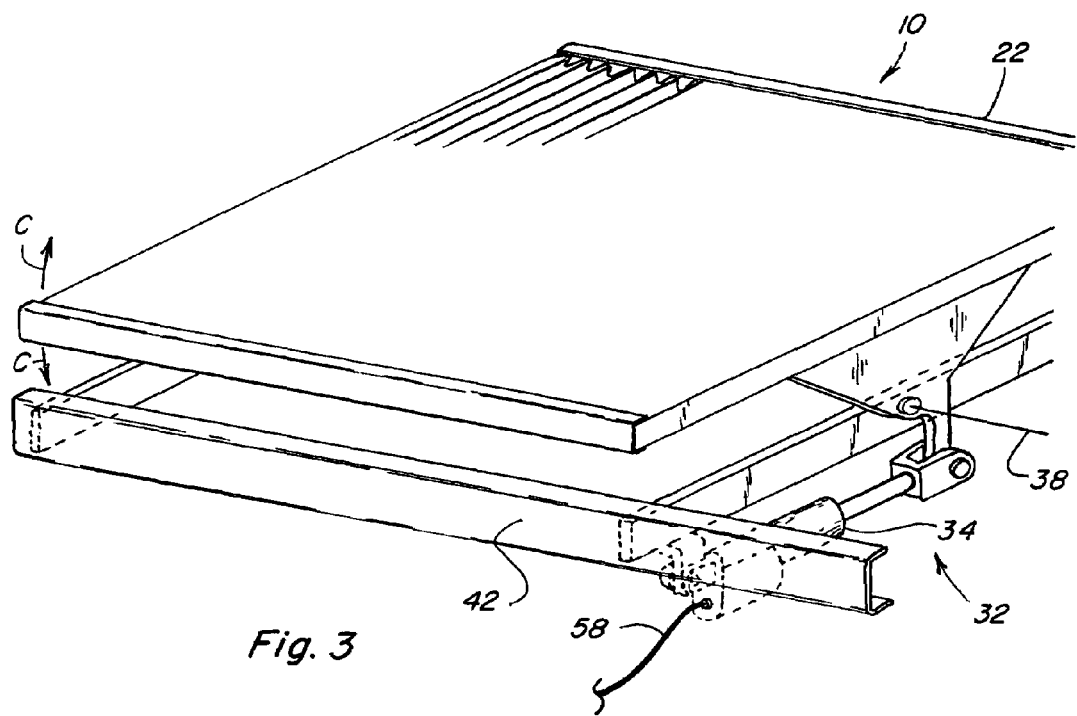
FIG. 3 is a fragmentary perspective representation of the crop material distributor or cleaning sieve and actuator of FIG. 2.
Figure 4:
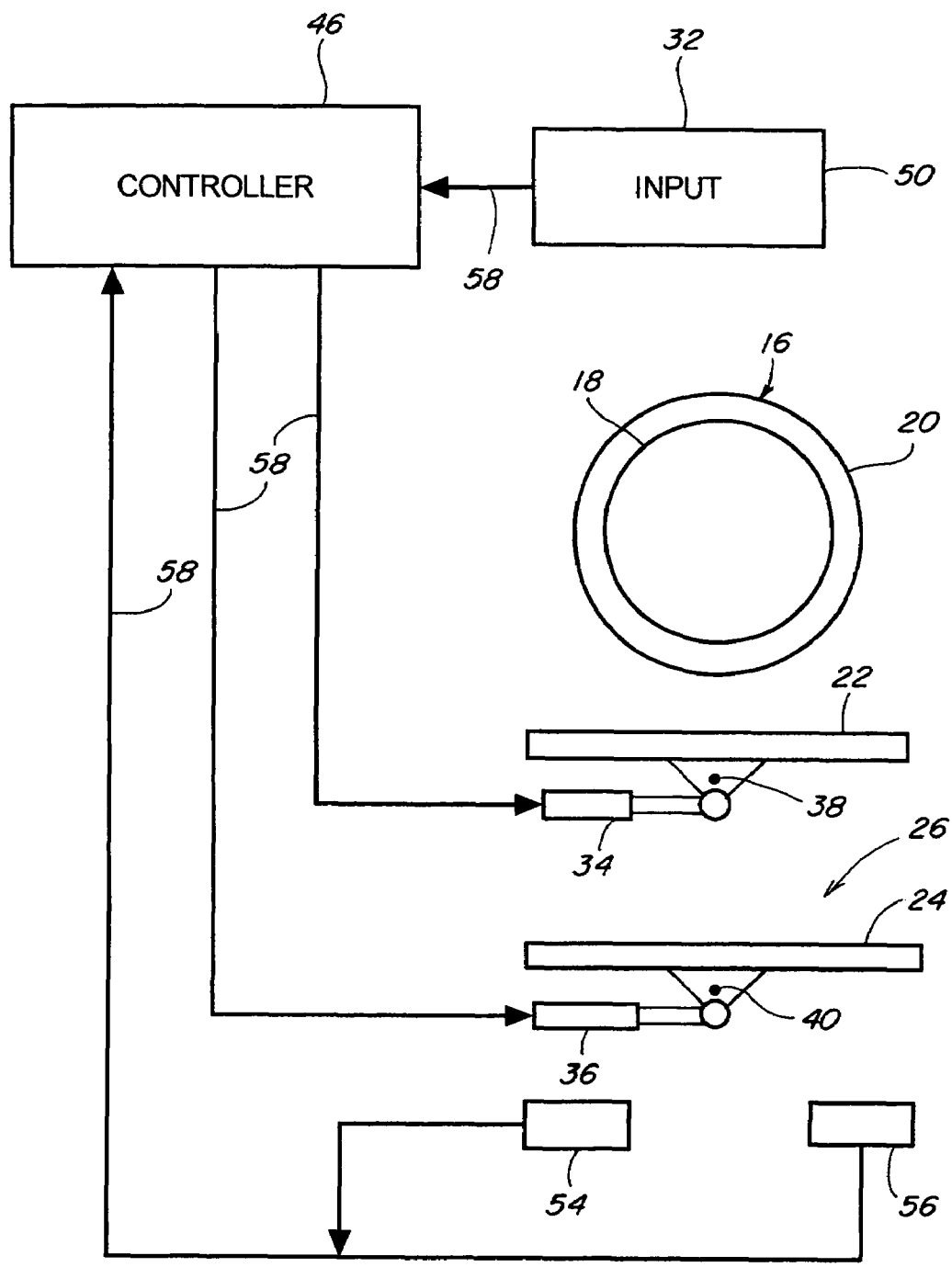
FIG. 4 is a diagrammatic representation of one embodiment of the system of the invention.
Figure 5:
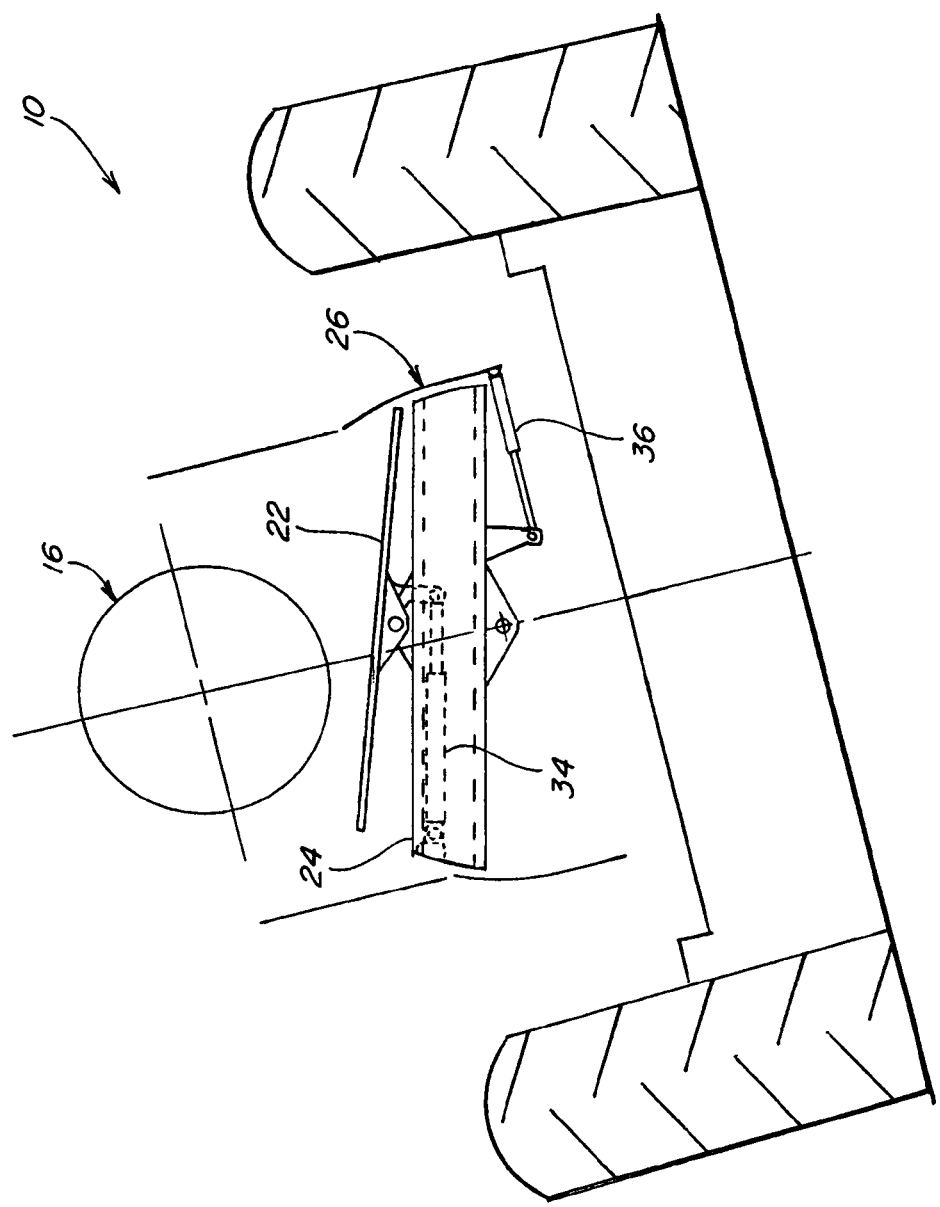
FIG. 5 is a simplified schematic rear view of the combine of FIG. 1, shown tilted sidewardly, and illustrating angularly oriented positions of a crop material distributor and cleaning sieve of the combine, respectively.

Referring also to FIGS. 2, 3 and 4, crop material distributor 22, and also at least upper cleaning sieve 24, are configured so as to be positionable within a predetermined range of angular positions when viewed from the front or rear, as controlled by an actuator 34 and an actuator 36, respectively. To provide this capability, distributor 22 and at least sieve 24 are supported within combine 10 for sideward pivotal movement, here, about a forward and rearward extending pivotal axis 38 and a similarly extending pivotal axis 40, disposed beneath distributor 22 and sieve 24, respectively. Actuator 34 preferably comprises a suitable device connected between a structural element 42, and an arm 44 projecting from distributor 22, and is operable for controllably sidewardly pivoting the distributor about axis 38, as generally denoted by arrow C in FIGS. 2 and 3. Actuator 36 can be similarly constructed and operable, or can be of different construction. Here, actuators 34 and 36 are both illustrated as being linear actuators which can be suitably powered, for instance, electrically or fluidly, in the well-known manner. Alternatively, the actuators could comprise rotary actuators, motors, or the like. As another alternative, one or both of distributor 22 and sieve 24 can be supported in a different manner, such as pivotally from one side. As still another alternative, actuator 34 and distributor 22 can be supported on cleaning system 26, and both sieves 24 and 30 of cleaning system 26 can pivot together, such that distributor 22 will be pivoted by pivotal movement of the sieves, as illustrated by the embodiment in FIG. 5. And, as a further alternative, sieve 24 and the entire cleaning system can be of a non-leveling variety, in which case, and actuator 36 and the pivoting support structure for sieve 24 would not be present.

In the embodiment of combine 10 shown, actuators 34 and 36 are both operatively connected to a single controller 46, which preferably comprises a conventional programmable processor based controller commonly utilized for controlling various combine operations and functions in the well-known manner. In this regard, controller 46 can control actuator 34 for controlling the position of distributor 22 for controlling grain distribution to sieve 24 as a function of a desired parameter according to the present invention, which here has been selected to be grain loss, while separately controlling actuator 36 for controlling the position of sieve 24 responsive to tilting of combine 10, as a function of a leveling system feature. Thus, system 32 comprises controller 46, but it should be recognized that controller 46 can perform a variety of other functions, including, but not limited to, cleaning system leveling. System 32 additionally is illustrated as comprising an optional input device 50, which can be for instance, an interactive device such as a touch screen or the like, or a switch, connected to controller 46 and located within an operator cab 52 of combine 10, usable for inputting positional and other commands to system 32, and optionally for viewing system information. System 32 preferably also comprises at least one sensor operable for sensing or detecting a condition indicative of performance thereof, and/or the effects of performance thereof, to facilitate monitoring and controlling operation thereof, which, in this embodiment of the system, preferably includes at least two grain loss detectors 54 and 56 disposed adjacent opposite ends of, or at spaced apart locations along, rear edge 28 of sieve 24. Additionally, if combine 10 includes a leveling system for cleaning system 26, this will typically include a tilt sensor operable for inputting information to controller 46, or another controller of the leveling system, for use in controlling the leveling of the cleaning system. This information, if present, can also be used by the system of the invention.

Controller 46 is connected to actuator 34; to actuator 36, if present (if a cleaning system leveling capability is provided); to input device 50; and to grain loss detectors 54 and 56, via suitable conductive paths 58, which can include, for instance, but are not limited to, wires of a wiring harness, and/or one or more communications networks, such as a controller area network.

Controller 46 is automatically operable for controlling the angular position of distributor 22 as a function of system 32, and at least sieve 24 of cleaning system 26 (sieves 24 and 30 being jointly or separately controllable, as desired for a particular application) as a function of the leveling system. Here, as explained above, under at least some circumstances, threshing system 16 will discharge crop material at higher rates, or in heavier concentrations, from some regions of concave 20 compared to others. This can occur for a variety of reasons, such as, but not limited to, crop type, population, and moisture content, and can vary at least somewhat over the course of a harvesting episode. This can also occur, at least in part, as a result of combine settings, such as, but not limited to, a speed of operation of rotor 18, and a gap between rotor 18 and concave 20. This is undesirable, as also explained above, as it can affect the performance of cleaning system 26, particularly the amount of grain loss, as heavy build ups of crop material, particularly on upper sieve 24, can result in increased grain loss over or past rear edge 28. A problem identified above in this regard is that crop material build ups and concentrations on distributor 22 will typically be conveyed onto upper sieve 24. Sideward tilting of the combine can also result in increased crop material concentrations and build ups, particularly toward the downhill side of the combine. Such build ups can be particularly problematic when the threshing system of a combine is more heavily discharging crop material toward the downhill side of the distributor.

Referring also to FIGS. 5, 6, 7, 8 and 9, system 32 is automatically operable for addressing and substantially reducing or eliminating crop material build ups on upper sieve 24 resulting from uneven flow of the crop mat from threshing system 16, by controlling the angular orientation of distributor 22 so as to even the feeding of the crop material mat onto upper sieve 24. As examples, in FIGS. 5, 6 and 7, combine 10 is illustrated tilted downwardly toward the left-hand side; in FIG. 8, combine 10 is illustrated tilted upwardly toward the left-hand side, and, in both instances, distributor 22 is illustrated as being angularly oriented as required for evening the crop flow therefrom to upper sieve 24.

Figure 6:
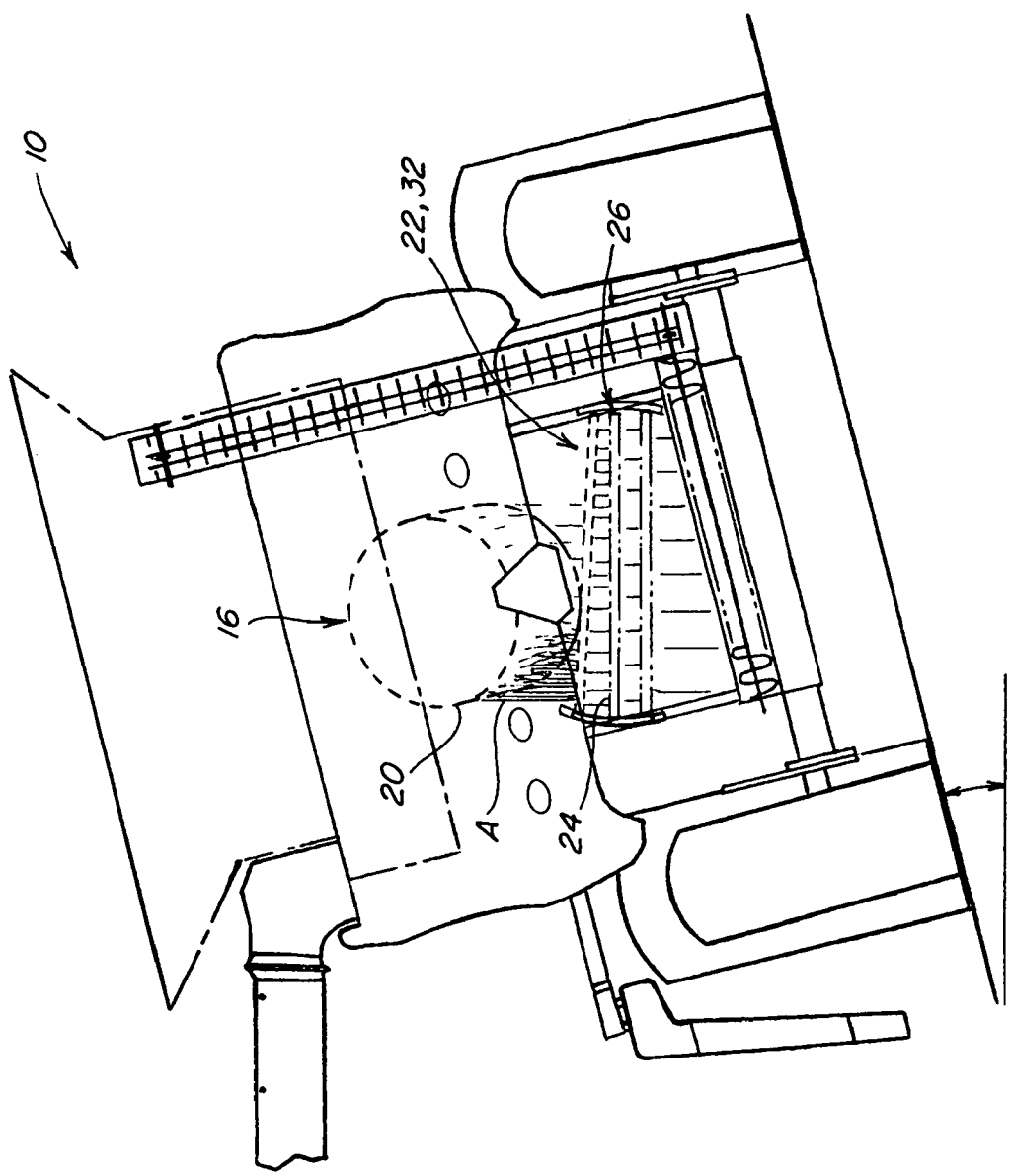
FIG. 6 is another rear view of the combine tilted sidewardly and showing the crop material distributor and cleaning sieve angularly oriented, and illustrating representative flows of crop material discharge from a threshing system onto the distributor, and resulting crop material flow from the distributor to an upper cleaning sieve, and grain flow through the cleaning system.
Figure 7:
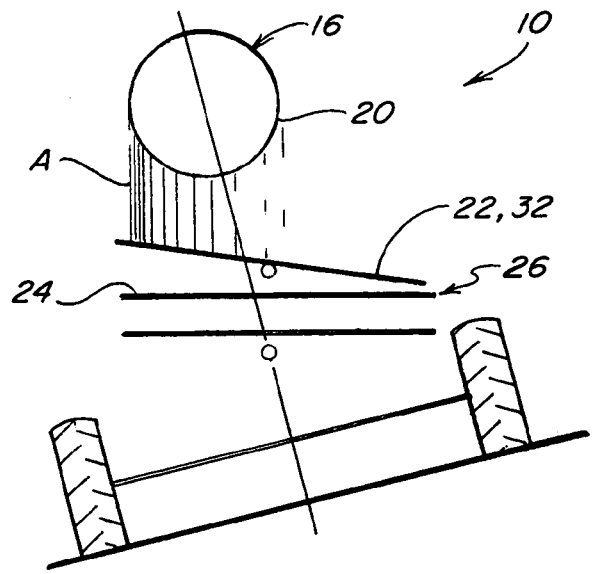
FIG. 7 is a simplified schematic rear view of the combine, tilted sidewardly, and illustrating representative crop material discharge from the threshing system onto the distributor, and crop material flow from the distributor to an upper cleaning sieve.

More particularly, in FIGS. 6 and 7, crop material flow A from concave 20 of threshing system 16 is illustrated as being heavier toward the left-hand side. As a result, the crop material deposition on the left-hand side of distributor 22 is heavier compared to the right-hand side. Responsively, actuator 34 is operated to position distributor 22 in an angular orientation extending downwardly by a required amount toward the right-hand side, such that the crop material mat falls evenly from distributor 22 onto upper sieve 24. Here, it should be observed that at least upper sieve 24 of cleaning system 26 is also tilted downwardly toward the right hand side relative to combine 10, as a function of the leveling system operation, so as to be level, or horizontal in the sideward direction, to thereby correct for the sideward tilt of combine 10. This serves to maintain performance of the cleaning system at a high level.

Figure 8:
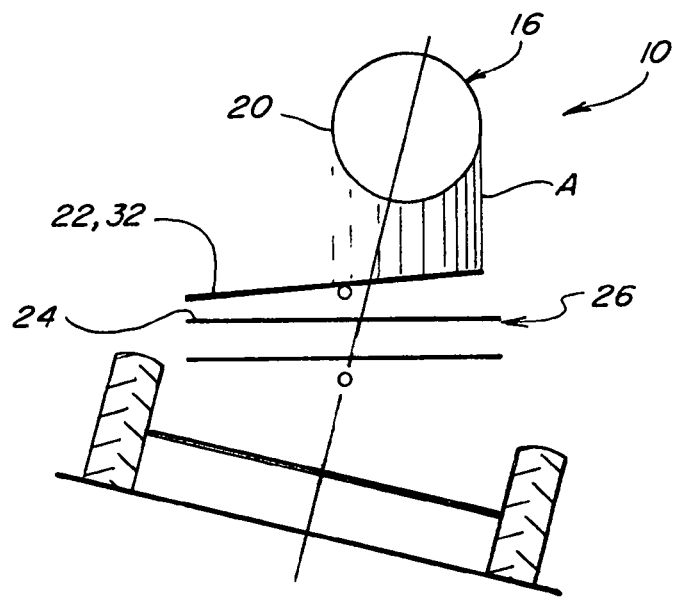
FIG. 8 is another simplified schematic rear view of the combine, tilted sidewardly in a different direction, and illustrating representative crop material discharge.

Referring more particularly to FIG. 8, combine 10 is illustrated tilted in the opposite direction, that is, upwardly toward the left-hand side, and crop material flow A from concave 20 of threshing system 16 is illustrated as being heavier toward the right-hand side. So as not to deposit the crop material mat onto sieve 22 in this uneven concentration, distributor 22 is automatically controlled so as to be angularly oriented by system 32, so as to extend downwardly by a required amount toward the left-hand side, to correct this distribution problem. As a result, as the material mat is conveyed over distributor 22 toward the rear end thereof, it will be spread toward the left-hand side so as to be more even. As in the previous example, the crop material mat will then drop in this more evenly distributed manner, onto upper sieve 24. Here, it should be noted that at least upper sieve 24 of cleaning system 26 is also tilted upwardly toward the right-hand side of combine 10, as a function of the leveling system operation, so as to be level, that is, horizontal in the sideward direction, to thereby correct for the sideward tilt of combine 10, to maintain performance of the cleaning system.

As a further detail, one can see that the sieve or sieves of cleaning system 26 could be tilted to one side, for instance, the left-hand side of combine 10, and distributor 22 tilted to the opposite side, for instance the right-hand side. The cleaning sieve would be tilted relative to the combine, but level to horizontal, to maintain minimal grain loss resulting from the slope of the ground, whereas distributor 22 would be tilted relative to the combine and horizontal to get material distributed to the cleaning system in an even mat or flow. The difference between the angular orientations of the distributor and cleaning sieve or sieves would be controlled as a function of the amount of grain loss sensed by the grain loss detectors. One should also note that it would be possible for the distributor and the cleaning sieve or sieves to be positioned at the same angular orientation, as would be the case if the threshing system delivered the crop material evenly to the distributor.

Further, controller 46 of system 32 is automatically operable for determining an angular orientation of distributor 22 required for evening out crop material flow to cleaning system 26, in an ongoing manner, in real-time, or near real-time, responsive to a sensed condition or conditions indicative of performance and/or another selected parameter, which here is grain loss, as sensed by grain loss detectors 54 and 56. The angular orientation of distributor 22 can also be set by an operator, via commands inputted using input device 50. System 32 can then automatically operate to maintain a performance parameter achieved by the inputted setting, for instance, a satisfactory or set grain loss level, and can operate to even out the grain loss between the two sides of the cleaning system, as a function of comparison of the signals from grain loss sensors 54 and 56. Thus, if grain distribution from the threshing system changes, for instance, as a function of any of the factors discussed above, and grain loss from one side of the cleaning system exceeds loss from the other side by a certain amount, system 32 can automatically detect this. Controller 46 can then responsively make an appropriate adjustments in the angular position of distributor 22 via actuator 34, as required.

Figure 9:
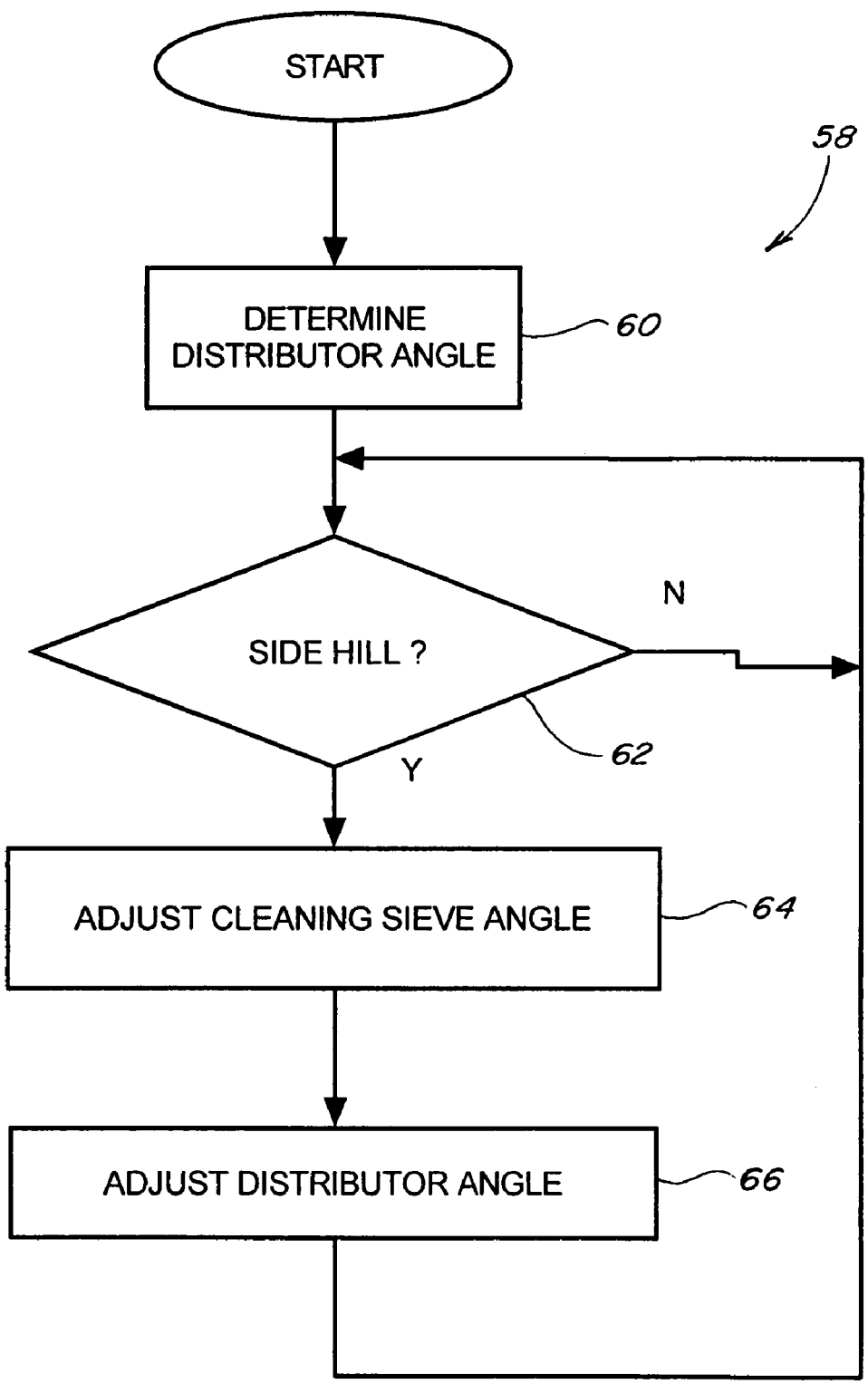
FIG. 9 is a high-level flow diagram illustrating steps of a method of the invention.

FIG. 9 is a high level flow diagram 58 illustrating steps of one possible method of operation of system 32 for controlling the orientation of distributor 22, in cooperation with a leveling system for controlling orientation of at least sieve 24 of cleaning system 26 responsive to tilting of combine 10. According to the method, at block 60, a distributor angle will be determined. This can be via an automatic process as controlled by controller 46, responsive to a desired parameter, such as grain loss, and the above-described manner. Alternatively, this could be responsive to a manually inputted command, via input device 50. Controller 46 will then either automatically control distributor 22 for controlling the control parameter, e.g., grain loss, or for maintaining the inputted position. As part of its cleaning system leveling function, controller 46 will also monitor sideward tilting of combine 10. If a side hill is detected, e.g., tilt, as denoted at decision block 62, controller 46 will adjust the angular orientation of cleaning sieve 24 (and other elements of the cleaning system if so equipped) so as to be level or horizontal, as denoted at block 64. Additionally, controller 46 can also operate to adjust the angular orientation of distributor 22 for the tilting condition, such that the control parameter, e.g., grain loss, or inputted command, is maintained, as denoted at block 66. In this latter regard, it should be recognized that when combine 10 is tilted, the locations of crop material deposition on distributor 22 can vary or change as a function of the degree of tilt. To accommodate this, controller 46 can be programmed to automatically adjust for such tilting, on an ongoing basis, in real-time, or near real-time, to maintain the control parameter, or the commanded angular orientation of distributor 22 in relation to a fixed reference, such as horizontal, so as to maintain system performance.

With the examples provided above, one can understand that about any combination of angles could be present between a distributor of a combine, and sieves of a cleaning system thereof. It should also be understood that the system of the invention is not limited to use with a self leveling cleaning system. In the event that a machine does not have a self leveling cleaning system, side hill performance can be further enhanced by tilting the distributor to deliver material to the uphill side. This would then allow for additional performance of a fixed cleaning system combine on side hills.

Figure 10:
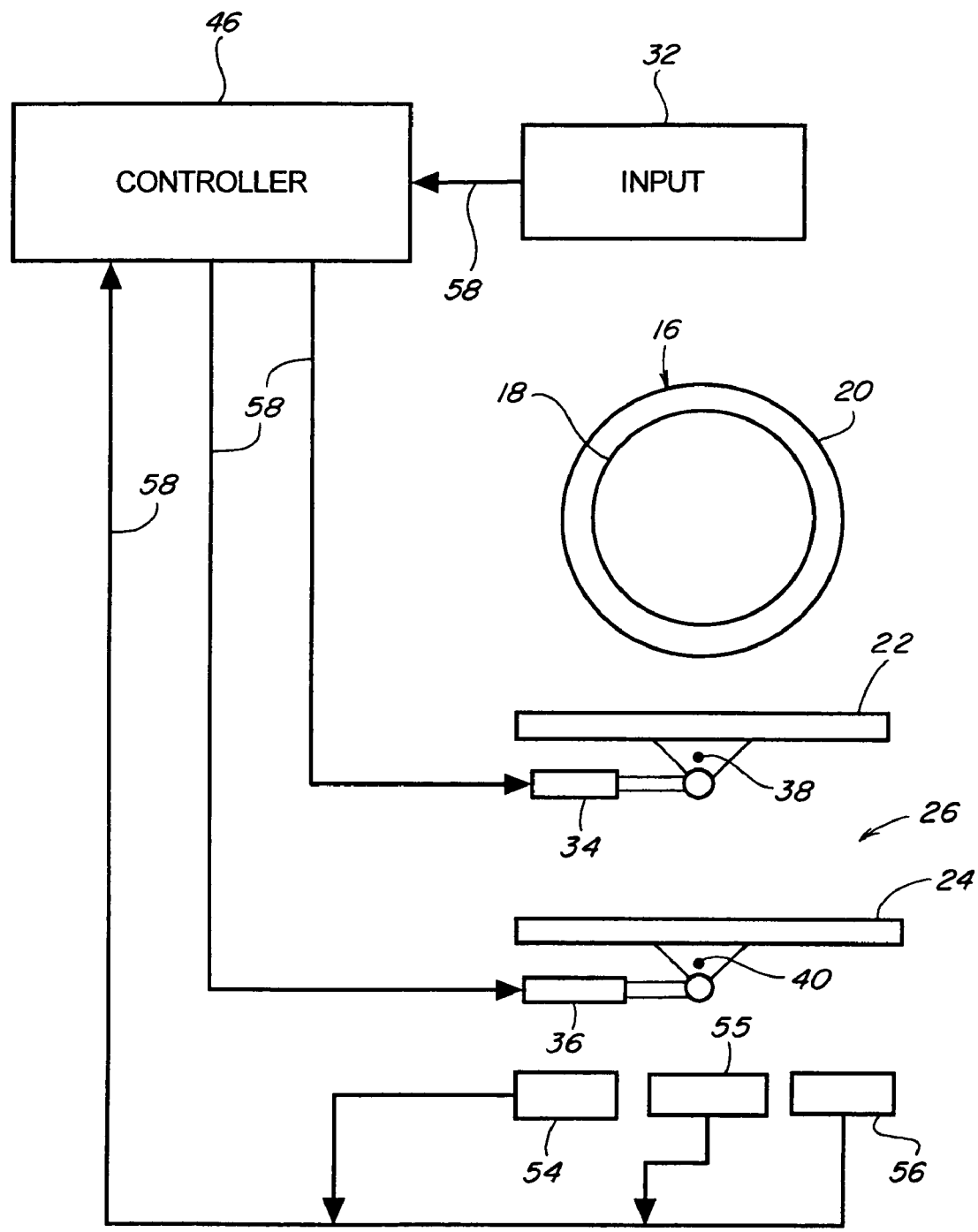
FIG. 10 is a diagrammatic representation of another embodiment of the system of the invention.
Figure 11:
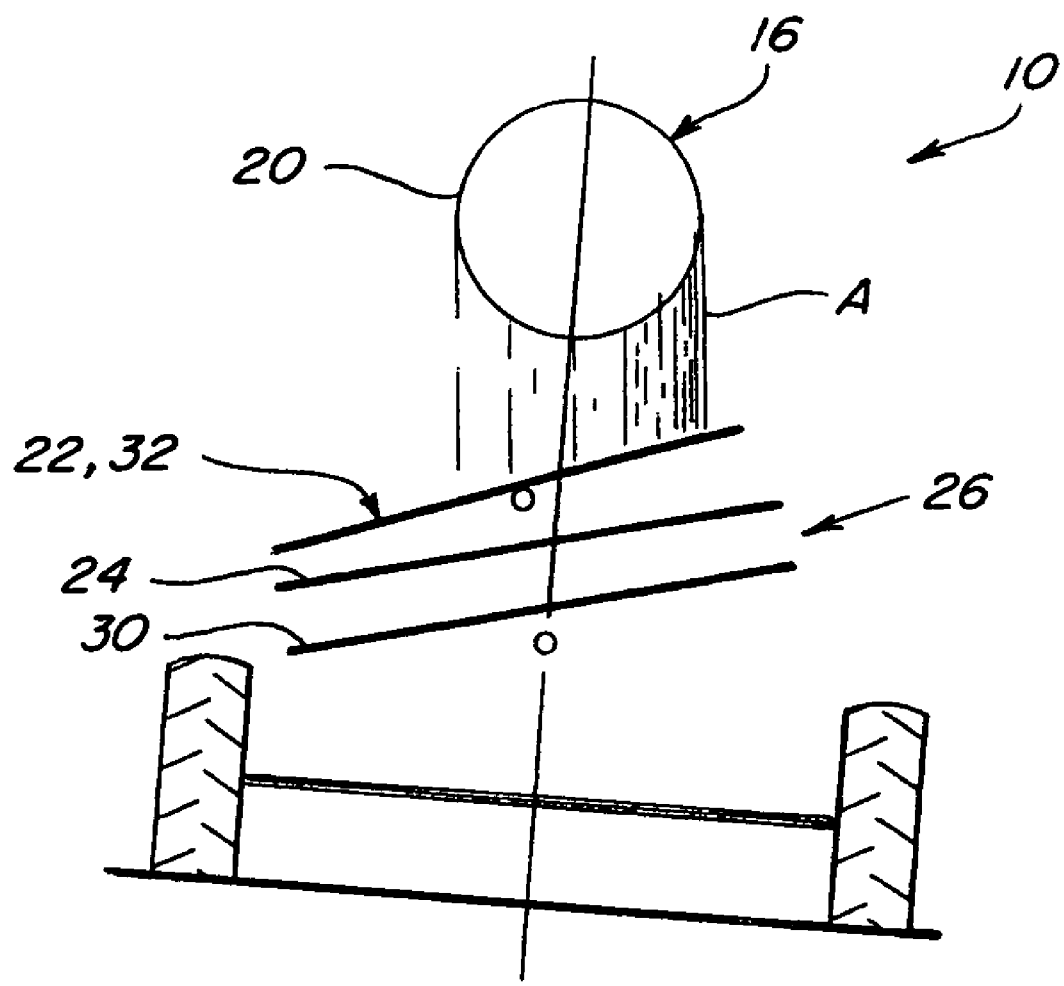
FIG. 11 is another simplified schematic rear view of the combine, tilted sidewardly, illustrating representative crop material discharge from the threshing system onto the distributor, and with the distributor and the sieves positioned at different angular orientations for distributing the crop material.

Referring also FIGS. 10 and 11, it is contemplated according to the invention, that system 32 can be configured so as to additionally control the angular orientation of at least upper sieve 24 of cleaning system 26, for also adjusting or evening distribution of crop material thereon. In this regard, it is contemplated that under some conditions, the possible variations in angular orientation of distributor 22 that can be effected by operation of system 32 may be inadequate to satisfactorily evenly distribute the crop material flow onto sieve 24, and, as a result, it would be advantageous to also control the angular orientation of that sieve for increasing or improving evenness of the distribution. This will be accomplished by control of actuator 36 via controller 46, and can be performed instead of or in association with leveling of one or both of the sieves of cleaning system 26. Additionally, according to this aspect of the invention, it is contemplated that controller 46 can automatically control actuators 34 and 36 for achieving a combination of angular orientations of distributor 22 and at least sieve 24, that will achieve a desired evenness of crop material distribution. Here, system 32 will be configured as described above, and, in addition to the elements already described, can include one or more additional grain loss detectors 55 disposed between detectors 54 and 56, so as to provide more detailed information regarding grain loss and thus crop material distribution on sieve 24. The one or more detectors 55 will be suitably connected to controller 46 via a suitable conductive path 58, as discussed above. In operation, an elevated grain loss detected by one or two of detectors 54, 55 and 56, would indicate uneven crop material distribution, and controller 46 would responsively determine a corrective angular position of one or both distributor 22, and sieves 24 and 30. In this regard, a stepped approach to adjusting the angular position of one or both could be employed, to incrementally approach an even crop material on sieve 24. Again, this can be performed on an ongoing, real-time, or near real-time basis.

Examining FIG. 11 in particular, crop material flow A from concave 20 of threshing system 16 is illustrated as being heavier toward the right-hand side, such that distributor 22 of system 32 is responsively tilted downwardly toward the left-hand side. If warranted, sieve 24 of cleaning system 26, and also sieve 30, can be also be tilted as required, here also downwardly toward the left-hand side, for achieving desired evenness of distribution of crop material on sieve 24, even when combine 10 is tilted. Thus, is demonstrated that system 32 is operable for overriding the leveling function for cleaning system 26, so as to achieve desired crop distribution thereon, and thus maximum performance.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A system for distributing crop material on a cleaning sieve of an agricultural combine, comprising:
   a threshing system;
   a sieve positioned and configured for receiving crop material containing grain from the threshing system and allowing the grain and smaller elements of the crop material to pass through the sieve while guiding and propelling a flow of larger elements of the crop material past an edge of the sieve;
   apparatus in connection with the sieve, including a first actuator configured and controllably operable for positioning the sieve within a range of angular orientations with respect to a reference;
   at least two grain loss sensor sensors disposed adjacent opposite ends of the rear edge, the sensors configured and operable for sensing information representative of a quantity of the grain present in the flow of the larger elements of the crop material past the edge of the sieve, and outputting signals representative thereof;
   a crop material distributor disposed between the threshing system and the sieve, configured and operable for distributing the crop material from the threshing system onto the sieve;
   apparatus in connection with the crop material distributor, including a second actuator configured and controllably operable for positioning the distributor within a range of angular orientations with respect to a reference, independent of the angular orientation of the sieve; and
   a control system connected in operative control of the second actuator, and to the grain loss sensor for receiving the signals outputted thereby, wherein the control system is automatically operable for controlling the second actuator for positioning the distributor at different angular orientations, for minimizing the quantity of the grain in the flow past the edge of the sieve, wherein the control system automatically controls the angular orientation of the distributor as a function of a comparison of the signals from the at least two grain loss sensors, wherein grain loss from one side of the distributor exceeds the grain loss from the other side by a measured amount.

2. The system of claim 1, wherein the control system is automatically operable for controlling the first actuator for leveling the sieve when the combine is tilted, and then for controlling the second actuator for positioning the distributor for minimizing the quantity of the grain in the flow past the edge of the sieve.

3. The system of claim 2, further comprising an input device in connection with the control system and operable for inputting commands for controlling the angular orientation of the distributor, and wherein the control system is operable for holding the distributor at a commanded orientation while leveling the sieve.

4. The system of claim 1, wherein the distributor comprises a sieve.

5. The system of claim 1, wherein the distributor comprises a pan.

* * * * *